(12) United States Patent
Wang et al.

(10) Patent No.: US 11,544,639 B2
(45) Date of Patent: Jan. 3, 2023

(54) DATA SOURCE-BASED SERVICE CUSTOMIZING DEVICE, METHOD AND SYSTEM, AND STORAGE MEDIUM

(71) Applicant: PING AN TECHNOLOGY (SHENZHEN) CO., LTD., Shenzhen (CN)

(72) Inventors: Jianzong Wang, Shenzhen (CN); Zhangcheng Huang, Shenzhen (CN); Tianbo Wu, Shenzhen (CN); Jing Xiao, Shenzhen (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 1103 days.

(21) Appl. No.: 16/084,565

(22) PCT Filed: Jun. 30, 2017

(86) PCT No.: PCT/CN2017/091367
§ 371 (c)(1),
(2) Date: Sep. 13, 2018

(87) PCT Pub. No.: WO2018/201601
PCT Pub. Date: Nov. 8, 2018

(65) Prior Publication Data
US 2020/0302346 A1 Sep. 24, 2020

(30) Foreign Application Priority Data
May 5, 2017 (CN) .......................... 201710313995.0

(51) Int. Cl.
*G06Q 10/04* (2012.01)
*G06N 20/00* (2019.01)
(Continued)

(52) U.S. Cl.
CPC ............ *G06Q 10/04* (2013.01); *G06K 9/6256* (2013.01); *G06K 9/6262* (2013.01); *G06N 7/005* (2013.01); *G06N 20/00* (2019.01)

(58) Field of Classification Search
CPC ........ G06Q 10/04; G06N 20/00; G06N 7/005; G06K 9/6256; G06K 9/6262
See application file for complete search history.

(56) References Cited

U.S. PATENT DOCUMENTS 6,889,222 B1 5/2005 Zhao
8,706,716 B2 4/2014 Kuznetsov et al.
(Continued)

FOREIGN PATENT DOCUMENTS

CN 101616356 A 12/2009
CN 101908191 A 12/2010
(Continued)

OTHER PUBLICATIONS

Chunli Zheng,"Data and Data Management System Research on Health Insurance"; Chinese Master's Theree Full-text database information as science and technology; p. 1138-379; Dec., Dec. 15, 2011.
(Continued)

*Primary Examiner* — Joseph L Greene

(57) ABSTRACT

The disclosure relates to a data source-based service customizing device, method and system, and a computer readable storage medium. The data source-based service customizing device includes: a memory, a processor and the data source-based service customizing system stored on the memory and operated on the processor. The data source-based service customizing system is executed by the processor to implement the following steps: acquiring user generated contents in various predetermined data sources; recognizing the user generated contents by using a user group label recognition model generated by pre-training to
(Continued)

recognize user group labels corresponding to the various data sources; determining group services corresponding to the various data sources according to a predetermined mapping relation between the user group labels and the group services, and sending the various data sources and the corresponding group services to a predetermined terminal to perform group service customization on the various data sources.

14 Claims, 5 Drawing Sheets

(51) Int. Cl.
*G06K 9/62* (2022.01)
*G06N 7/00* (2006.01)

(56) References Cited

U.S. PATENT DOCUMENTS

| | | | | |
|---|---|---|---|---|
| 10,984,666 | B1* | 4/2021 | Depaolo | G06K 9/6278 |
| 2012/0072300 | A1 | 3/2012 | Andreasen et al. | |
| 2015/0263925 | A1* | 9/2015 | Shivashankar | H04L 43/04 |
| | | | | 709/224 |
| 2016/0078454 | A1* | 3/2016 | Ellen | H04L 67/02 |
| | | | | 705/7.29 |
| 2017/0185921 | A1* | 6/2017 | Zhang | G06N 20/00 |
| 2018/0053095 | A1* | 2/2018 | Farrell | G06F 16/9024 |
| 2018/0165697 | A1* | 6/2018 | Stolorz | G06N 5/04 |

FOREIGN PATENT DOCUMENTS

| | | |
|---|---|---|
| CN | 102647716 A | 8/2012 |
| CN | 103810192 A | 5/2014 |
| CN | 103995858 A | 8/2014 |
| CN | 104090888 A | 10/2014 |
| CN | 104184824 A | 12/2014 |
| CN | 106156127 A | 11/2016 |
| CN | 106372113 A | 2/2017 |
| CN | 106547798 A | 3/2017 |
| CN | 106572173 A | 4/2017 |
| TW | 505878 B | 10/2002 |

OTHER PUBLICATIONS

Search Report of European Patent Application No. 17899235.0 dated Apr. 5, 2019.
Anonymous, Web mining, Wikipedia, Apr. 15, 2017, pp. 1-7, retrieved from the Internet: URL:https://en.wikipedia.org/w/index.php?title=Web_mining&oldid=775539542.

* cited by examiner

DATA SOURCE-BASED SERVICE CUSTOMIZING DEVICE, METHOD AND SYSTEM, AND STORAGE MEDIUM

CROSS REFERENCES TO RELATED APPLICATIONS

This application is the national phase entry of International Application PCT/CN2017/091367, filed on Jun. 30, 2017, which is based upon and claims priority to China Patent Application No. CN2017103139950, filed on May 5, 2017 and entitled "Data Source-based Service Customizing Device and Method, and Computer Readable Storage Medium", which are hereby incorporated by reference in its entirety.

TECHNICAL FIELD

This disclosure relates to the technical field of Internets, and more particularly relates to data source-based service customizing device, method and system, and a computer readable storage medium.

BACKGROUND

A UGC (User Generated Content) is a content created by a user in participation of a website or other open media. This content can be independently transmitted, displayed and played, for example, microblogs, BBS discussions, user-made audios/videos, questions and answers, various net-news, etc. At the present, many financial companies (for example, banks, insurance companies, etc.) analyze these user generated contents, and determine a behavior characteristic label of the user, thus customizing (promoting) a corresponding service according to the behavior characteristic label of the user.

However, with regard to massive user generated contents on the network, this solution of determining the behavior characteristic label of each user and customizing the service for each user would lead to an extremely large limitation to the customization of the services, so that the service customization efficiency is low.

SUMMARY

The disclosure aims at providing a data source-based service customizing device, method and system, and a computer readable storage medium, and is designed to customize services within a large range based on massive data sources to improve the service customization efficiency.

To achieve the above objective, the disclosure provides a data source-based service customizing device; the device includes: a memory, a processor and a data source-based service customizing system which is stored on the memory and is operated on the processor. The data source-based service customizing system is executed by the processor to implement the following steps:

S1, acquiring user generated content in various predetermined data sources;

S2, recognizing the user generated contents by using a user group label recognition model generated by pre-training to recognize user group labels corresponding to the various data sources;

S3, determining group services corresponding to the various data sources according to a predetermined mapping relation between the user group labels and the group services, and sending the various data sources and the corresponding group services to a predetermined terminal to perform group service customization on the various data sources.

To achieve the above objective, the disclosure also provides a data source-based service customizing method, which includes:

S1, acquiring user generated content in various predetermined data sources;

S2, recognizing the user generated contents by using a user group label recognition model generated by pre-training to recognize user group labels corresponding to the various data sources;

S3, determining group services corresponding to the various data sources according to a predetermined mapping relation between the user group labels and the group services, and sending the various data sources and the corresponding group services to a predetermined terminal to perform group service customization on the various data sources.

To achieve the above objective, the disclosure provides a data source-based service customizing system, which includes:

an acquisition module, which is used for acquiring user generated content in various predetermined data sources;

a recognition module, which is used for recognizing the user generated contents by using a user group label recognition model generated by pre-training to recognize user group labels corresponding to the various data sources;

a determination module, which is used for determining group services corresponding to the various data sources according to a predetermined mapping relation between the user group labels and the group services, and sending the various data sources and the corresponding group services to a predetermined terminal to perform group service customization on the various data sources.

The disclosure further provides a computer readable storage medium which stores a data source-based service customizing system. The data source-based service customizing system is executed by a processor to implement the following steps:

S1, acquiring user generated content in various predetermined data sources;

S2, recognizing the user generated contents by using a user group label recognition model generated by pre-training to recognize user group labels corresponding to the various data sources;

S3, determining group services corresponding to the various data sources according to a predetermined mapping relation between the user group labels and the group services, and sending the various data sources and the corresponding group services to a predetermined terminal to perform group service customization on the various data sources.

The disclosure has the beneficial effects that the disclosure acquires the user generated contents in the various predetermined data sources, recognizes the user group labels corresponding to the various data sources by using the user group label recognition model, determines the group services corresponding to the various data sources, and sends the various data sources and the corresponding group services to the predetermined terminal. The disclosure quickly and accurately recognizes users in the various data sources by using the user group label recognition model to recognize the user group labels corresponding to the various data sources, and performs the group service customization based on the user group labels corresponding to the massive data sources, so that the service customization can be realized within a large range, and the service customization efficiency is improved.

DETAILED DESCRIPTION

For the purpose of making objectives, technical solutions and advantages of the disclosure clearer and more understandable, a further detailed description will be made below to the disclosure in combination with accompanying drawings and embodiments. It should be understood that the specific embodiments described herein are merely explanatory of the disclosure, but not intended to limit the disclosure. Based on the embodiments in the disclosure, all the other embodiments obtained by ordinary persons skilled in the art without paying creative work shall all fall within the scope of protection of the disclosure.

It should be noted that descriptions such as "first" and "second" in the disclosure are only for description, but not understood as indicating or implying their relative importance or impliedly expressing the quantity of indicated technical features. Therefore, features defined by "first" and "second" can definitely or impliedly include at least one of these features. In addition, the technical solutions among all the embodiments may be combined mutually, but it must be based on the fact that the ordinary persons skilled in the art can implement these combinations. When the combinations of the technical solutions contradict each other or cannot be implemented, it should not consider that these combinations of the technical solutions exist, and fall within the scope of protection claimed by the disclosure.

Figure 1:
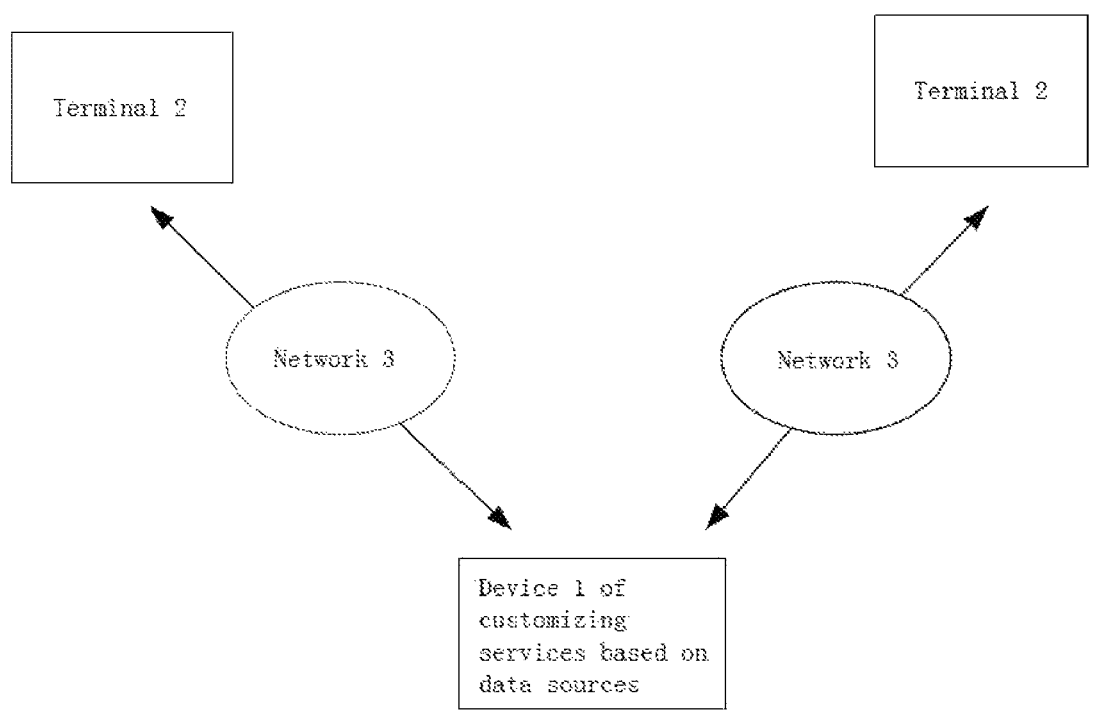
FIG. 1 is a schematic diagram of an optional application enlivenment of all embodiments of the disclosure.

With reference to FIG. 1, it is a schematic diagram of an optional application environment of all embodiments of the disclosure.

In this embodiment, the disclosure may be applied to an application environment including, but not limited to, a data source-based service customizing device 1, a terminal 2 and a network 3, wherein the terminal equipment 2 includes, but not limited to, any electronic product capable of performing human-machine interaction with a user by means of a keyboard, a mouse, a remote controller, a touch panel or voice control equipment, for example, mobile equipment such as a personal computer, a flat computer, a smart phone, a PDA (Personal Digital Assistant), a game machine, an IPTV (Internet Protocol Television), intelligent wearable equipment and a navigation device, or a fixed terminal such as a digital TV, a desk computer, a notebook computer and a server. The data source-based service customizing device 1 may be mobile equipment such as a mobile phone, a smart phone, a notebook computer, a digital broadcast receiver, a PDA, a PAD (flat computer), a PMP (Portable Multimedia Player) and a navigation device, and a fixed terminal such as a digital TV, a desk computer, a notebook computer and a server. The network 3 may be a wireless or wired network such as an enterprise Intranet, an Internet, a GSM (Global System of Mobile communication), a WCDMA (Wideband Code Division Multiple Address), a 4G network, a 5G network, Bluetooth and Wi-Fi (Wireless Fidelity), wherein the data source-based service customizing device 1 is connected with one or more terminals 2 respectively through the network 3 in a communication manner.

The data source-based service customizing device 1 is equipment capable of automatically calculating a value and/or processing information according to a preset or pre-stored instruction. The data source-based service customizing device 1 may be a computer, a single network server, a server group consisting of multiple network servers, or a cloud computing-based cloud consisting of a large number of hosts or network servers, wherein as one of distributed computations, cloud computing is a super virtual computer consisting of a group of loosely-coupled computer sets.

Figure 2:
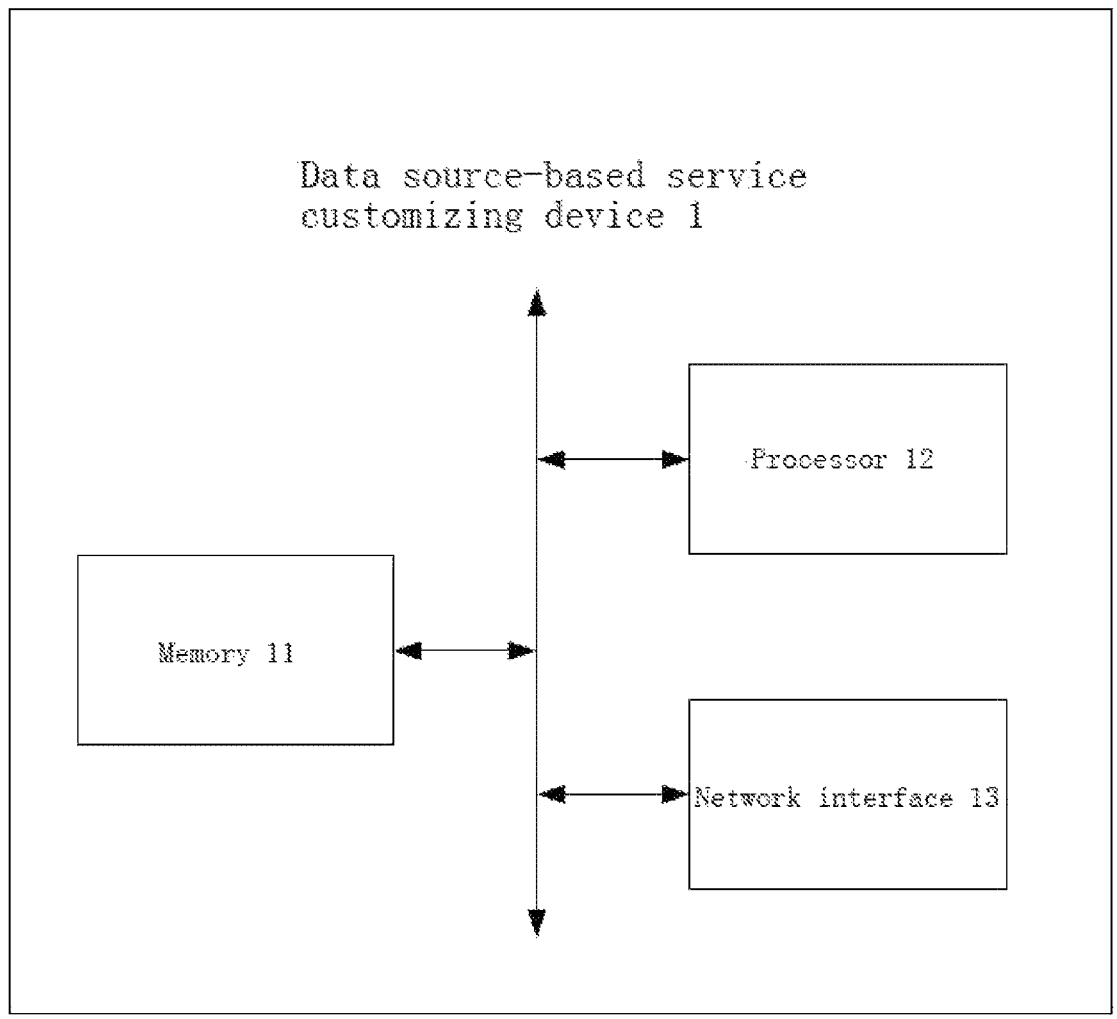
FIG. 2 is a schematic diagram of a hardware architecture of one embodiment of data source-based service customizing device in FIG. 1.

With reference to FIG. 2, it is a schematic diagram of an optional hardware architecture of the data source-based service customizing device 1 in FIG. 1. In this embodiment, the data source-based service customizing device 1 may include, but not limited to, a memory 11, a processor 12 and a network interface 13 which are connected with one another through a system bus in a communicating manner. It should be noted that FIG. 2 only shows the data source-based service customizing device 1 having assemblies from 11 to 13, but it should be understood that it does not require that all the shown assemblies are implemented, and to be substitutable, more or fewer assemblies are implemented.

Wherein, the memory 11 at least includes one type of readable storage medium. The readable storage medium includes a flash memory, a hard disk, a multimedia card, a card type memory (for example, an SD (Secure Digital) or DX memory), an RAM (Random Access Memory), an SRAM (Static Random Access Memory), an ROM (Read-Only Memory), an EEPROM (Electrically Erasable Programmable Read-Only Memory), a PROM (Programmable Read-Only Memory), a magnetic memory, a magnetic disk, an optical disk, etc. In some embodiments, the memory 11 may be an internal storage unit of the data source-based service customizing device 1, for example, a hard disk or an internal storage of the data source-based service customizing device 1; and in some other embodiments, the memory 11 also may be external storage equipment of the data source-based service customizing device 1, for example, a plug-in type hard disk, an SMC (Smart Media Card), an SD card, an FC (Flash Card) and the like which are equipped on the data source-based service customizing device 1. Of course, the memory 11 also may include the internal storage unit and the external storage equipment of the data source-based service customizing device 1. In this embodiment, the memory 11 is generally used for storing an operating system and all types of application software which are installed in the data source-based service customizing device 1, for example, a program code of a data source-based service customizing system and the like. In addition, the memory 11 also may be used for temporarily storing all types of data which have been output or are about to be output.

The processor 12 in some embodiments may be a CPU (Central Processing Unit), a controller, a micro controller, a micro processor or other data processing chips. The processor 12 is generally used for controlling overall operation of the data source-based service customizing device 1, for example, executing control and processing related to data interaction or communication with the terminal 2 and the like. In this embodiment, the processor 12 is used for operating the program code stored in the memory 11 or processing data, for example, operating the data source-based service customizing system.

The network interface 13 may include a wireless network interface or a wired network interface. The network interface 13 is generally used for establishing communication connection between the data source-based service customizing device 1 and other sets of electronic equipment. In this embodiment, the network interface 13 is mainly used for connecting the data source-based service customizing device 1 with one or multiple terminals 2 through the network 3 to establish a data transmission channel and communication connection.

Figure 3:
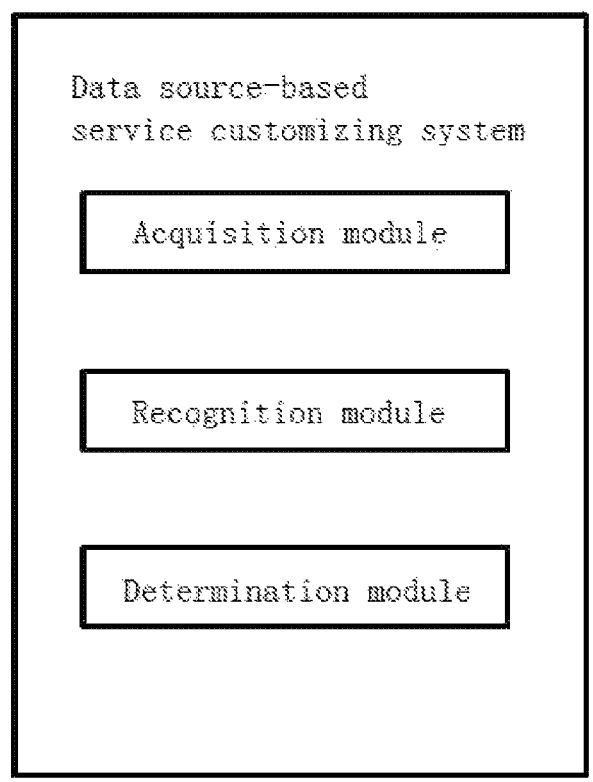
FIG. 3 is a schematic diagram of a structure of one embodiment of a data source-based service customizing system of the disclosure.

The data source-based service customizing system is stored in the memory 11, and includes at least one computer readable instruction stored in the memory 11. The at least one computer readable instruction may be executed by the processor 12 to implement methods of transactions on blockchains of all embodiments of the disclosure. As mentioned above, the at least one computer readable instruction may be divided into different logic modules according to different functions realized by all its parts, as shown in FIG. 3, including an acquisition module, a recognition module and a determination module.

Wherein, the data source-based service customizing system is executed by the processor 12 to implement the following steps:

Step S1, user generated contents in various predetermined data sources are acquired;

in this embodiment, the predetermined data sources may be microblog websites, BBS sites, netnews sites, etc., wherein each data source has a large number of users, and each user can participate in or generate the user generated contents by him/herself.

In this embodiment, the data source-based service customizing system may acquire the user generated contents in the various data sources in real time to acquire the latest user generated contents in the various data sources, and also may regularly (for example, every 1 hour) acquire the user generated contents in the various data sources to relieve the system burden.

Specifically, after being generated in one data source, a user generated content may be actively sent to the above-mentioned service customizing system, or is stored into a storage region of a predetermined server, and the data source-based service customizing system acquires this user generated content from the server.

Step S2, the user generated contents are recognized by using a user group label recognition model generated by pre-training to recognize user group labels corresponding to the various data sources;

wherein the pre-trained user group label recognition model is a machine learning model, for example, a support vector machine model or a random forest model, etc., and of course, it may be other models.

Preferably, the user group label recognition model is a model built on the basis of the maximum entropy criterion; the probability distribution having the maximum entropy is used as a probability distribution of behavior attributes of the users; a model function of the user group label recognition model includes a user behavior attribute distribution function which is used for describing probability distribution conditions of the behavior attributes corresponding to the various users; the user behavior attribute distribution function is as follows:

$$p\Lambda(y|x) = \frac{1}{Z(x)} \exp\left(\sum_{j=1}^{F} f_j(x, y)\lambda_{j,y}\right).$$

The user behavior attribute distribution function is an exponential distribution function, wherein x is a user, y is a user label (the user label is, for example, "financial management", "stock" or "insurance", etc.), $f_j(x, y)$ is the jth behavior attribute (the behavior attributes of the users are behaviors of the users in the data sources, for example, including contents published or discussed by the users in the data sources, etc.) of the user x, F is a total number of the behavior attributes of the user x, $\lambda_{j,y} = \{\lambda_{1,y}, \lambda_{2,y}, \lambda_{3,y}, \ldots, \lambda_{F,y}\}$ is the probability distribution (namely) of the behavior attributes of the user, and Z (x) is a normalization factor, and is used for enabling the user behavior attribute distribution function $p\Lambda(y|x)$ to be normalized within a range of [0, 1], and its value is $$\sum_{i=1}^{N} p\Lambda(y_i|x_i) * \exp\left(\sum_{j=1}^{F} f_j(x, y)\lambda_{j,y}\right).$$

In this embodiment, the user group label recognition model built on the basis of the maximum entropy criterion is used for accurately and quickly recognizing the user group labels of the various data sources.

Further, based on the above-mentioned user behavior attribute distribution function, the model function of the user group label recognition model also includes an optimization function which is a calculation method for solving an optimal solution or a maximum score. The optimization function is as follows:

$$\arg\max\left(\sum_{i=1}^{N} p(x_i, y_i)\log p\Lambda(y_i|x_i) - \beta\|\Lambda\|_2^2\right),$$

wherein $\lambda_{j,y}$ is expressed by $\Lambda = \{\lambda_{1,y}, \lambda_{2,y}, \ldots, \lambda_{F,y}\}$ (namely it is the probability distribution of the behavior attributes of a user), $p(x_i, y_i)$ is a probability that a label $y_i$ of a user $x_i$ appears in the user group labels $$\sum_{i=1}^{N} p(x_i, y_i)\log p\Lambda(y_i|x_i)$$

is a likelihood function of the behavior attributes of a user, $\beta\|\Lambda\|_2^2$ is a normalization factor, and $\beta$ is a parameter for controlling the normalization degree of the optimization function, and its value range is [0, 1]. Preferably, $\beta$ is equal to 0.6.

Wherein, argmax represents searching a parameter having the maximum score, and solving and making this parameter have the maximum value for any user, so that the user group labels of the various data sources may be expressed by $\overline{\lambda}$.

Step S3, group services corresponding to the various data sources are determined according to a predetermined mapping relation between the user group labels and the group services, and the various data sources and the corresponding group services are sent to a predetermined terminal to perform group service customization on the various data sources.

In this embodiment, relevant mapping is performed on the user group labels and the corresponding group services in advance. For example, for user group labels of "financial management" or "stock", the group services subjected to the relevant mapping with these user group labels are stock services, fund services, bond services, futures services, insurance services, etc.; for user group labels of "insurance", the group services subjected to the relevant mapping with these user group labels are property insurance services, life insurance services, vehicle insurance services, shipping insurance services, etc.; for another example, for the user group labels of "life insurance", the group services subjected to the relevant mapping with these user group labels are life insurance services (including investment-oriented, deposit-oriented, annuity-oriented, ordinary insurances, etc.), health insurance services, accident insurance services, etc.; and the mapping relation between the user group labels and the group services is stored (for example, it is stored by means of a list).

After the user group labels of the various data sources are recognized, the corresponding group services are acquired according to the stored mapping relation between the user group labels and the group services, and the various data sources and the corresponding group services are sent to the predetermined terminal, for example, they are sent to a terminal of a service promoter of the group services, so that the service promoter can customize or promote the group services to all the users of the data sources.

Compared with the prior art, this embodiment acquires the user generated contents in the various predetermined data sources, recognizes the user group labels corresponding to the various data sources by using the user group label recognition model, determines the group services corresponding to the various data sources, and sends the various data sources and the corresponding group services to the predetermined terminal. This embodiment quickly and accurately recognizes users in the various data sources by using the user group label recognition model to recognize the user group labels corresponding to the various data sources, and performs the group service customization based on the user group labels corresponding to the massive data sources, so that the service customization can be performed within a large range, and the service customization efficiency is improved.

In one preferred embodiment, on the basis of the embodiment of FIG. 1, to quickly solve the user group label recognition model, a solving process of the user group label recognition model includes a solving iteration step. The objective of the solving iteration step of the user group label recognition model is to obtain a formula in which the differential is zero. The solving iteration step is as follows:

Supposing that the behavior attribute distribution function of one given data source is written as $L(\Lambda)$, then $\Lambda=\{\lambda_{1,y}, \lambda_{2,y}, \ldots, \lambda_{F,y}\}$. Supposing that $\Lambda+\Delta=\{\lambda_{1,y}+\delta_1, \lambda_{2,y}+\delta_2, \lambda_{3,y}+\delta_3 \ldots \}$ during solving of the probability distribution of the user behavior attributes, such a formula below is obtained according to the above-mentioned optimization function:

$$L(\Lambda + \Delta, p) - L(\Lambda, p) = \sum_{x,y} p(x,y) \sum_{i=1}^{F} \delta_i f_i(x,y) - \sum_x p(x) \log \frac{Z_{\Lambda'(x)}}{Z_{\Lambda(x)}} - \beta \sum_i^F (\delta_i^2 + 2\lambda_i \delta_i);$$

in the existence of an inequality $-\log \alpha \geq \alpha$ exists, there is:

$$L(\Lambda + \Delta, p) - L(\Lambda, p) \geq$$

$$\sum_{x,y} p(x,y) \sum_{i=1}^{F} \delta_i f_i(x,y) + 1 - \sum_x p(x) \log \frac{Z_{\Lambda'(x)}}{Z_{\Lambda(x)}} - \beta \sum_i^F (\delta_i^2 + 2\lambda_i \delta_i) =$$

$$\sum_{x,y} p(x,y) \sum_{i=1}^{F} \delta_i f_i(x,y) + 1 -$$

$$\sum_x p(x) \sum p\Lambda(y|x) \exp\left(\sum_i \delta_i f_i(x,y)\right) - \beta \sum_i^F (\delta_i^2 + 2\lambda_i \delta_i);$$

in addition, due to the Jensen's inequality $p(x) \geq \exp q(x) \geq \Sigma \exp p(x) q(x)$, there is:

$$L(\Lambda + \Delta, p) - L(\Lambda, p) \geq \sum_{x,y} p(x,y) \sum_{i=1}^{F} \delta_i f_i(x,y) + 1 -$$

$$\sum_x p(x) \sum p\Lambda(y|x) \sum \left(\frac{f_i(x,y)}{\sum f_i(x,y)} \exp\left(\delta_i \sum_i f_i(x,y)\right)\right) -$$

$$\beta \sum_i^F (\delta_i^2 + 2\lambda_i \delta_i);$$

and derivative calculation is performed to obtain (the formula in which the differential is zero):

$$\frac{\partial (L(\Lambda + \Delta, p) - L(\Lambda, p))}{\partial \delta_i} = \sum_{x,y} p(x,y) f_i(x,y) -$$

$$\sum_x p(x) \sum p\Lambda(y|x) f_i(x,y) \exp\left(\delta_i \sum_i f_i(x,y)\right) - 2\beta \sum_i^F (\delta_i + \lambda_i).$$

Preferably, the user group label recognition model also includes differential mode iteration in each iteration process. The objective of the differential mode iteration is to quickly work out an approximate solution that the above-mentioned formula $$\frac{\partial (L(\Lambda + \Delta, p) - L(\Lambda, p))}{\partial \delta_i} \text{ is } 0:$$

Supposing that the above-mentioned formula $$\frac{\partial (L(\Lambda + \Delta, p) - L(\Lambda, p))}{\partial \delta_i} \text{ is } f(\delta_i),$$

during solving of each step of iteration, it needs to make a derivative 0. As the form of this formula is like $ae^{bx}+cx+d=0$, this formula is relatively hard to solve. Therefore, this formula is solved by a Newton-Raphson method. As x is an extremely small value, there is:

$$\delta_i^{(0)} = \log(\frac{\sum_{x,y} p(x,y) f_i(x,y)}{\sum_x p(x) \sum_i p\Lambda(y|x) f_i(x,y)}) / \sum_i f_i(x,y);$$

$$\delta_i^{(1)} = \delta_i^{(0)} - \frac{f(\delta_i^{(0)})}{f'(\delta_i^{(0)})};$$

by parity of reasoning (the formula below is the approximate solution of the above-mentioned formula in which the differential is zero), there is:

$$\delta_i^{(n+1)} = \delta_i^{(n)} - \frac{f(\delta_i^{(n)})}{f'(\delta_i^{(n)})};$$

when $f(\delta_i^{(n+1)}) < \tau$, the iteration is ended, wherein $\tau$ is a value for controlling the convergence accuracy, and the solving is completed at this time.

In one preferred embodiment, on the basis of the above-mentioned embodiment of FIG. 2, to obtain a model capable of accurately and quickly recognizing the user group labels of the data sources by training, before the data source-based service customizing system is executed by the processor 12 to execute the step S1, the following steps are also implemented:

S01, user generated contents in a preset number (for example, 1,000) of data sources are acquired, the acquired user generated content in each data source is taken as a group data sample, and each group data sample is labeled with a corresponding user group label, wherein each group data sample may be labeled with one or more user group labels, and the user group labels include, for example, "financial management", "insurance", etc.

S02, the group data samples are classified into a training set at a preset first proportion (for example, 50 percent) and a verification set at a preset second proportion (for example, 25 percent), wherein the sum of the first proportion and the second proportion is less than or equal to 1;

S03, the predetermined user group label recognition model is trained by using the group data samples in the training set, and after the training, the accuracy of the trained user group label recognition model is verified by using the verification set;

S04, if the accuracy is greater than a preset threshold value (for example, 98.5 percent), the model training is ended, and the trained user group label recognition model is used as the user group label recognition model in the above-mentioned step S2, or if the accuracy is less than or equal to the preset threshold value, the number of data sources is increased, for example, 300 data sources are added, and the user group label recognition model is retrained on the basis of the increased number of data sources.

Figure 4:
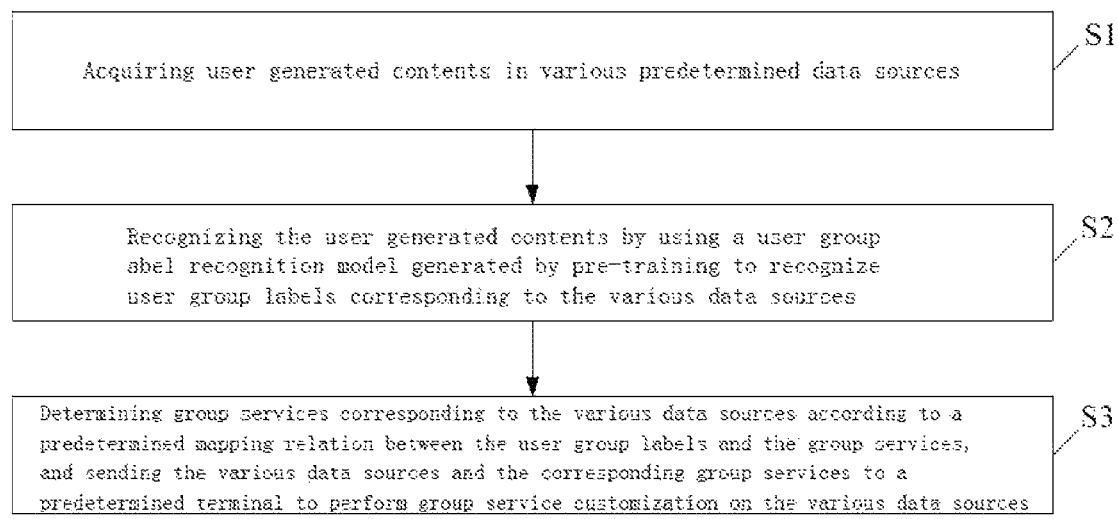
FIG. 4 is a flowchart of a first embodiment of a data source-based service customizing method of the disclosure.

As shown in FIG. 4, it is a flowchart of one embodiment of a data source-based service customizing method of the disclosure. The data source-based service customizing method includes:

Step S1, user generated contents in various predetermined data sources are acquired;

in this embodiment, the predetermined data sources may be microblog websites, BBS sites, netnews sites, etc., wherein each data source has a large number of users, and each user can participate in or generate the user generated contents by him/herself.

In this embodiment, a data source-based service customizing system may acquire the user generated contents in the various data sources in real time to acquire the latest user generated contents in the various data sources, and also may regularly (for example, every 1 hour) acquire the user generated contents in the various data sources to relieve the system burden.

Specifically, after being generated in one data source, a user generated content may be actively sent to the above-mentioned service customizing system, or is stored into a storage region of a predetermined server, and the service customizing system acquires this user generated content from the server.

Step S2, the user generated contents are recognized by using a pre-trained user group label recognition model to recognize user group labels corresponding to the various data sources;

wherein the group label recognition model generated by pre-training is a machine learning model, for example, a support vector machine model or a random forest model, etc., and of course, it may be other models.

Preferably, the user group label recognition model is a model built on the basis of the maximum entropy criterion; the probability distribution having the maximum entropy is used as a probability distribution of behavior attributes of the users; a model function of the user group label recognition model includes a user behavior attribute distribution function which is used for describing probability distribution conditions of the behavior attributes corresponding to the various users; the user behavior attribute distribution function is as follows:

$$p\Lambda(y|x) = \frac{1}{Z(x)} \exp\left(\sum_{j=1}^{F} f_j(x, y) \lambda_{j,y}\right).$$

The user behavior attribute distribution function is an exponential distribution function, wherein x is a user, y is a user label (the user label is, for example, "financial management", "stock" or "insurance", etc.), $f_j(x, y)$ is the jth behavior attribute (the behavior attributes of the users are behaviors of the users in the data sources, for example, including contents published or discussed by the users in the data sources, etc.) of the user x, F is a total number of the behavior attributes of the user x, $\lambda_{j,y} = \{\lambda_{1,y}, \lambda_{2,y}, \lambda_{3,y}, \ldots, \lambda_{F,y}\}$ is the probability distribution (namely) of the behavior attributes of the user, and Z (x) is a normalization factor, and is used for enabling the user behavior attribute distribution function $P\Lambda(y|x)$ to be normalized within a range of [0, 1], and its value is $$\sum_{i=1}^{N} p\Lambda(y_i|x_i) * \exp\left(\sum_{j=1}^{F} f_j(x, y) \lambda_{j,y}\right).$$

In this embodiment, the user group label recognition model built on the basis of the maximum entropy criterion is used for accurately and quickly recognizing the user group labels of the various data sources.

Further, based on the above-mentioned user behavior attribute distribution function, the model function of the user group label recognition model also includes an optimization function which is a calculation method for solving an optimal solution or a maximum score. The optimization function is as follows:

$$\text{argmax}\left(\sum_{i=1}^{N} p(x_i, y_i)\log p\Lambda(y_i \mid x_i) - \beta\|\Lambda\|_2^2\right),$$

wherein $\lambda_{j,y}$ is expressed by $\Lambda=\{\lambda_{1,y}, \lambda_{2,y}, \ldots, \lambda_{F,y}\}$ (namely it is the probability distribution of the behavior attributes of a user), $p(x_i,y_i)$ is a probability that a label $y_i$ of a user $x_i$ appears in the $$\sum_{i=1}^{N} p(x_i, y_i)\log p\Lambda(y_i \mid x_i)$$

user group labels, is a likelihood function of the behavior attributes of a user, $\beta\|\Lambda\|_2^2$, is a normalization factor, and $\beta$ is a parameter for controlling the normalization degree of the optimization function, and its value range is [0, 1]. Preferably, $\beta$ is equal to 0.6.

Wherein, argmax represents searching a parameter having the maximum score, and solving and making this parameter have the maximum value for any user, so that the user group labels of the various data sources may be expressed by $\vec{\lambda}$.

Step S3, group services corresponding to the various data sources are determined according to a predetermined mapping relation between the user group labels and the group services, and the various data sources and the corresponding group services are sent to a predetermined terminal to perform group service customization on the various data sources.

In this embodiment, relevant mapping is performed on the user group labels and the corresponding group services in advance. For example, for user group labels of "financial management" or "stock", the group services subjected to the relevant mapping with these user group labels are stock services, fund services, bond services, futures services, insurance services, etc.; for user group labels of "insurance", the group services subjected to the relevant mapping with these user group labels are property insurance services, life insurance services, vehicle insurance services, shipping insurance services, etc.; for another example, for the user group labels of "life insurance", the group services subjected to the relevant mapping with these user group labels are life insurance services (including investment-oriented, deposit-oriented, annuity-oriented, ordinary insurances, etc.), health insurance services, accident insurance services, etc.; and the mapping relation between the user group labels and the group services is stored (for example, it is stored by means of a list).

After the user group labels of the various data sources are recognized, the corresponding group services are acquired according to the stored mapping relation between the user group labels and the group services, and the various data sources and the corresponding group services are sent to the predetermined terminal, for example, they are sent to a terminal of a service promoter of the group services, so that the service promoter can customize or promote the group services to all the users of the data sources.

Compared with the prior art, this embodiment acquires the user generated contents in the various predetermined data sources, recognizes the user group labels corresponding to the various data sources by using the user group label recognition model, determines the group services corresponding to the various data sources, and sends the various data sources and the corresponding group services to the predetermined terminal. This embodiment quickly and accurately recognizes users in the various data sources by using the user group label recognition model to recognize the user group labels corresponding to the various data sources, and performs the group service customization based on the user group labels corresponding to the massive data sources, so that the service customization can be performed within a large range, and the service customization efficiency is improved.

In one preferred embodiment, on the basis of the embodiment of FIG. 4, to quickly solve the user group label recognition model, a solving process of the user group label recognition model includes a solving iteration step. The objective of the solving iteration step of the user group label recognition model is to obtain a formula in which the differential is zero. The solving iteration step is as follows:

supposing that the behavior attribute distribution function of one given data source is written as $L(\Lambda)$, $\Lambda=\{\lambda_{1,y}, \lambda_{2,y}, \ldots, \lambda_{F,y}\}$. Supposing that $\Lambda+\Delta=\{\lambda_{1,y}+\delta_1, \lambda_{2,y}+\delta_2, \lambda_{3,y}+\lambda_3 \ldots\}$ during solving of the probability distribution of the user behavior attributes, such a formula below is obtained according to the above-mentioned optimization function:

$$L(\Lambda + \Delta, p) - L(\Lambda, p) = \sum_{x,y} p(x, y)\sum_{i=1}^{F} \delta_i f_i(x, y) - \sum_{x} p(x)\log\frac{Z_{\Lambda'(x)}}{Z_{\Lambda(x)}} - \beta\sum_{i}^{F}(\delta_i^2 + 2\lambda_i\delta_i);$$

in the existence of an inequality $-\log \alpha \geq \alpha$ exists, there is:

$$L(\Lambda + \Delta, p) - L(\Lambda, p) \geq$$
$$\sum_{x,y} p(x, y)\sum_{i=1}^{F} \delta_i f_i(x, y) + 1 - \sum_{x} p(x)\log\frac{Z_{\Lambda'(x)}}{Z_{\Lambda(x)}} - \beta\sum_{i}^{F}(\delta_i^2 + 2\lambda_i\delta_i) =$$
$$\sum_{x,y} p(x, y)\sum_{i=1}^{F} \delta_i f_i(x, y) + 1 -$$
$$\sum_{x} p(x)\sum_{y} p\Lambda(y \mid x)\exp\left(\sum_{i} \delta_i f_i(x, y)\right) - \beta\sum_{i}^{F}(\delta_i^2 + 2\lambda_i\delta_i);$$

in addition, due to the Jensen's inequality $p(x)$ exp $q(x) \geq \exp p(x)q(x)$, there is:

$$L(\Lambda + \Delta, p) - L(\Lambda, p) \geq \sum_{x,y} p(x, y)\sum_{i=1}^{F} \delta_i f_i(x, y) + 1 - \sum_{x} p(x)$$
$$\sum p\Lambda(y \mid x)\sum\left(\frac{f_i(x, y)}{\sum f_i(x, y)}\exp\left(\delta_i \sum_{i} f_i(x, y)\right)\right) - \beta\sum_{i}^{F}(\delta_i^2 + 2\lambda_i\delta_i)$$

and derivative calculation is performed to obtain (the formula in which the differential is zero):

$$\frac{\partial(L(\Lambda+\Delta,p)-L(\Lambda,p))}{\partial \delta_i} = \sum_{x,y} p(x,y)f_i(x,y) -$$

$$\sum_x p(x) \sum p\Lambda(y|x)f_i(x,y)\exp\left(\delta_i \sum_i f_i(x,y)\right) - 2\beta \sum_i^F (\delta_i + \lambda_i).$$

Preferably, the user group label recognition model also includes differential mode iteration in each iteration process. The objective of the differential mode iteration is to quickly work out an approximate solution that the above-mentioned $$\frac{\partial(L(\Lambda+\Delta,p)-L(\Lambda,p))}{\partial \delta_i} \text{ is 0:}$$

formula $$\frac{\partial(L(\Lambda+\Delta,p)-L(\Lambda,p))}{\partial \delta_i} \text{ is } f(\delta_i),$$

Supposing that the above-mentioned formula during solving of each step of iteration, it needs to make a derivative 0. As the form of this formula is like $ae^{bx}+cx+d=0$, this formula is relatively hard to solve. Therefore, this formula is solved by a Newton-Raphson method. As x is an extremely small value, there is:

$$\delta_i^{(0)} = \log\left(\frac{\sum_{x,y} p(x,y)f_i(x,y)}{\sum_x p(x)\sum p\Lambda(y|x)f_i(x,y)} \middle/ \sum_i f_i(x,y)\right);$$

$$\delta_i^{(1)} = \delta_i^{(0)} - \frac{f(\delta_i^{(0)})}{f'(\delta_i^{(0)})};$$

by parity of reasoning (the formula below is the approximate solution of the above-mentioned formula in which the differential is zero), there is:

$$\delta_i^{(n+1)} = \delta_i^{(n)} - \frac{f(\delta_i^{(n)})}{f'(\delta_i^{(n)})};$$

when, the iteration is ended, wherein is a value for controlling the convergence accuracy, and the solving is completed at this time.

Figure 5:
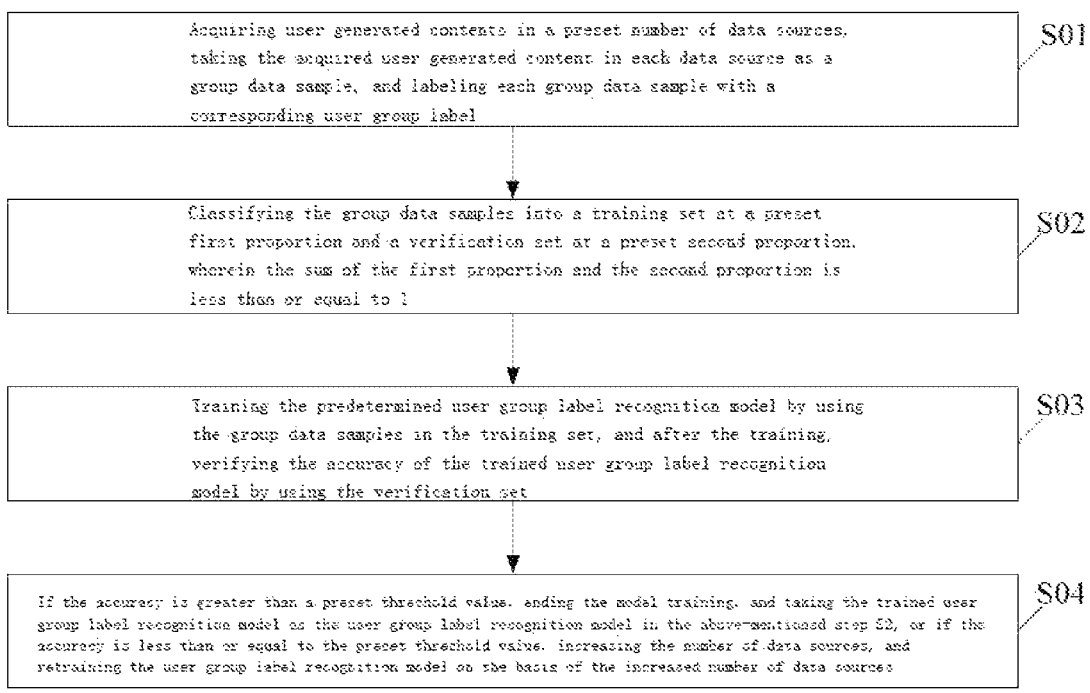
FIG. 5 is a flowchart of a second embodiment of a data source-based service customizing method of the disclosure.

In one preferred embodiment, as shown in FIG. 5, on the basis of the above-mentioned embodiment of FIG. 4, to obtain a model capable of accurately and quickly recognizing the user group labels of the data sources by training, before the above-mentioned step S1, the method also includes:

S01, user generated contents in a preset number (for example, 1,000) of data sources are acquired, the acquired user generated content in each data source is taken as a group data sample, and each group data sample is labeled with a corresponding user group label, wherein each group data sample may be labeled with one or more user group labels, and the user group labels include, for example, "financial management", "insurance", etc.

S02, the group data samples are classified into a training set at a preset first proportion (for example, 50 percent) and a verification set at a preset second proportion (for example, 25 percent), wherein the sum of the first proportion and the second proportion is less than or equal to 1;

S03, the predetermined user group label recognition model is trained by using the group data samples in the training set, and after the training, the accuracy of the trained user group label recognition model is verified by using the verification set;

S04, if the accuracy is greater than a preset threshold value (for example, 98.5 percent), the model training is ended, and the trained user group label recognition model is used as the user group label recognition model in the above-mentioned step S2, or if the accuracy is less than or equal to the preset threshold value, the number of data sources is increased, for example, 300 data sources are added, and the user group label recognition model is retrained on the basis of the increased number of data sources.

The disclosure further provides a computer readable storage medium. The computer readable storage medium stores a data source-based service customizing system. The data source-based service customizing system is executed by a processor to implement the steps of the above-mentioned data source-based service customizing method.

The foregoing numbering of the embodiments of the disclosure is merely descriptive, but is not indicative of the advantages and disadvantages of these embodiments.

By the description of the foregoing implementation modes, it will be evident to those skilled in the art that the methods according to the above-mentioned embodiments may be implemented by means of software and a necessary general-purpose hardware platform; they may of course be implemented by hardware, but in many cases, the former will be more advantageous. Based on such an understanding, the essential technical solution of the disclosure, or the portion that contributes to the prior art may be embodied as software products. Computer software products can be stored in a storage medium (e.g., an ROM/RAM (Read Only Memory/Random Access Memory), a magnetic disk, an optical disc) and may include a plurality of instructions that can enable a set of terminal equipment (e.g., a mobile phone, a computer, a server, an air conditioner, or network equipment) to execute the methods described in the various embodiments of the disclosure.

The foregoing descriptions are only preferred embodiments of the disclosure, but not intended to limit the patentable scope of the disclosure. Any equivalent structure or equivalent flow transformations that are made by taking advantages of the contents of the description and the accompanying drawings of the disclosure and are directly or indirectly applied to other relevant technical fields shall all fall within the patentable protection scope of the disclosure in a similar way.

What is claimed is:

1. A data source-based service customizing device, comprising a memory, a processor and a data source-based service customizing system, wherein the data source-based service customizing system is stored on the memory and is operated on the processor, and wherein the data source-based service customizing system is executed by the processor to implement the following steps:

S1, acquiring user generated contents in various data sources;

S2, recognizing the user generated contents by using a user group label recognition model generated by pre-training to recognize user group labels corresponding to the various data sources;

S3, determining group services corresponding to the various data sources according to a predetermined mapping relation between the user group labels and the group services, and sending the various data sources and the corresponding group services to a predetermined terminal, so that a service promoter customizes the group services to users of the various data sources;

wherein the user group label recognition model is built on the basis of a maximum entropy criterion described as follows: a model function of the user group label recognition model comprises a user behavior attribute distribution function, the user behavior attribute distribution function is as follows:

$$p\Lambda(y \mid x) = \frac{1}{Z(x)} \exp\left(\sum_{j=1}^{F} f_j(x, y) \lambda_{j,y}\right);$$

x is a user, y is a user label, $f_j(x, y)$ is the $j^{th}$ behavior attribute of the user xx, $\lambda_{j,y} = \{\lambda_{1,y}, \lambda_{2,y}, \lambda_{3,y}, \ldots, \lambda_{F,y}\}$ is the probability distribution of the behavior attributes of the user, and Z(x) is a normalization factor;

wherein the model function of the user group label recognition model further comprises an optimization function, the optimization function is as follows:

$$\arg\max\left(\sum_{i=1}^{N} p(x_i, y_i) \log p\Lambda(y_i \mid x_i) - \beta \|\Lambda\|_2^2\right);$$

$p(x_i, y_i)$ is a probability that a label yi of the user xi appears in the user group labels, $$\sum_{i=1}^{N} p(x_i, y_i) \log p\Lambda(y_i \mid x_i)$$

is a likelihood function of the behavior attributes of the user, $\beta \|\Lambda\|_2^2$ is a normalization factor, and β is a parameter for controlling the normalization degree of the optimization function.

2. The data source-based service customizing device according to claim 1, wherein a recognition process of the user group label recognition model comprises solving iteration for the probability distribution of the behavior attributes of the users.

3. The data source-based service customizing device according to claim 1, wherein before the data source-based service customizing system is executed by the processor to execute the step S1, the following steps are further implemented:

S01, acquiring user generated contents in a preset number of data sources, taking the acquired user generated content in each data source as a group data sample, and labeling each group data sample with a corresponding user group label;

S02, classifying the group data samples into a training set at a preset first proportion and a verification set at a preset second proportion, wherein the sum of the first proportion and the second proportion is less than or equal to 1;

S03, training the predetermined user group label recognition model by using the group data samples in the training set, and after the training, verifying the accuracy of the trained user group label recognition model by using the verification set;

S04, if the accuracy is greater than a preset threshold value, ending the model training, and taking the trained user group label recognition model as the user group label recognition model in the above-mentioned step S2, or if the accuracy is less than or equal to the preset threshold value, increasing the number of data sources, and retraining the user group label recognition model on the basis of the increased number of data sources.

4. A method of customizing services based on data sources, comprising:

S1, acquiring user generated contents in various data sources;

S2, recognizing the user generated contents by using a pre-trained user group label recognition model to recognize user group labels corresponding to the various data sources;

S3, determining group services corresponding to the various data sources according to a predetermined mapping relation between the user group labels and the group services, and sending the various data sources and the corresponding group services, so that a service promoter customizes the group services to users of the various data sources;

wherein the user group label recognition model is built on the basis of a maximum entropy criterion described as follows: a model function of the user group label recognition model comprises a user behavior attribute distribution function, the user behavior attribute distribution function is as follows:

$$p\Lambda(y \mid x) = \frac{1}{Z(x)} \exp\left(\sum_{j=1}^{F} f_j(x, y) \lambda_{j,y}\right);$$

x is a user, y is a user label, $f_j(x, y)$ is the $j^n$ behavior attribute of the user x, $\lambda_{j,y} = \{\lambda_{1,y}, \lambda_{2,y}, \lambda_{3,y}, \ldots, \lambda_{F,y}\}$ is the probability distribution of the behavior attributes of the user, and Z(x) is a normalization factor;

wherein the model function of the user group label recognition model further comprises an optimization function, the optimization function is as follows:

$$\arg\max\left(\sum_{i=1}^{N} p(x_i, y_i) \log p\Lambda(y_i \mid x_i) - \beta \|\Lambda\|_2^2\right);$$

$p(x_i, y_i)$ is a probability that a label yi of the user xi appears in the user group labels, $$\sum_{i=1}^{N} p(x_i, y_i) \log p\Lambda(y_i \mid x_i)$$

is a likelihood function of the behavior attributes of the user, $\beta\|\Lambda\|_2^2$ is a normalization factor, and $\beta$ is a parameter for controlling the normalization degree of the optimization function.

5. The data source-based service customizing method according to claim 4, wherein a recognition process of the user group label recognition model comprises solving iteration for the probability distribution of the behavior attributes of the users.

6. The data source-based service customizing method according to claim 4, before the step S1, further comprising:
   S01, acquiring user generated contents in a preset number of data sources, taking the acquired user generated content in each data source as a group data sample, and labeling each group data sample with a corresponding user group label;
   S02, classifying the group data samples into a training set at a preset first proportion and a verification set at a preset second proportion, wherein the sum of the first proportion and the second proportion is less than or equal to 1;
   S03, training the predetermined user group label recognition model by using the group data samples in the training set, and after the training, verifying the accuracy of the trained user group label recognition model by using the verification set;
   S04, if the accuracy is greater than a preset threshold value, ending the model training, and taking the trained user group label recognition model as the user group label recognition model in the above-mentioned step S2, or if the accuracy is less than or equal to the preset threshold value, increasing the number of data sources, and retraining the user group label recognition model on the basis of the increased number of data sources.

7. A non-transitory computer readable storage medium, wherein the computer readable storage medium stores a data source-based service customizing system, and the data source-based service customizing system is executed by a processor to implement the following steps:
   S1, acquiring user generated contents in various data sources;
   S2, recognizing the user generated contents by using a user group label recognition model generated by pre-training to recognize user group labels corresponding to the various data sources;
   S3, determining group services corresponding to the various data sources according to a predetermined mapping relation between the user group labels and the group services, and sending the various data sources and the corresponding group services to a predetermined terminal, so that a service promoter customizes the group services to users of the various data sources;
   wherein the user group label recognition model is built on the basis of a maximum entropy criterion described as follows: a model function of the user group label recognition model comprises a user behavior attribute distribution function, the user behavior attribute distribution function is as follows:

$$p\Lambda(y\mid x) = \frac{1}{Z(x)}\exp\left(\sum_{j=1}^{F} f_j(x, y)\lambda_{j,y}\right);$$

x is a user, y is a user label, $f_j(x, y)$ is the $j^{th}$ behavior attribute of the user x, $\lambda_{j,y} = \{\lambda_{1,y}, \lambda_{2,y}, \lambda_{3,y}, \ldots, \lambda_{F,y}\}$ is the probability distribution of the behavior attributes of the user, and Z(x) is a normalization factor;
   wherein the model function of the user group label recognition model further comprises an optimization function, the optimization function is as follows:

$$\arg\max\left(\sum_{i=1}^{N} p(x_i, y_i)\log p\Lambda(y_i\mid x_i) - \beta\|\Lambda\|_2^2\right);$$

$p(x_i, y_i)$ is a probability that a label yi of the user xi appears in the user group labels, $$\sum_{i=1}^{N} p(x_i, y_i)\log p\Lambda(y_i\mid x_i)$$

is a likelihood function of the behavior attributes of the user, $\beta\|\Lambda\|_2^2$ is a normalization factor, and $\beta$ is a parameter for controlling the normalization degree of the optimization function.

8. The non-transitory computer readable storage medium according to claim 7, wherein a recognition process of the user group label recognition model comprises solving iteration for the probability distribution of the behavior attributes of the users.

9. The non-transitory computer readable storage medium according to claim 7, wherein before the data source-based service customizing system is executed by the processor to execute the step S1, the following steps are further implemented:
   S01, acquiring user generated contents in a preset number of data sources, taking the acquired user generated content in each data source as a group data sample, and labeling each group data sample with a corresponding user group label;
   S02, classifying the group data samples into a training set at a preset first proportion and a verification set at a preset second proportion, wherein the sum of the first proportion and the second proportion is less than or equal to 1;
   S03, training the predetermined user group label recognition model by using the group data samples in the training set, and after the training, verifying the accuracy of the trained user group label recognition model by using the verification set;
   S04, if the accuracy is greater than a preset threshold value, ending the model training, and taking the trained user group label recognition model as the user group label recognition model in the above-mentioned step S2, or if the accuracy is less than or equal to the preset threshold value, increasing the number of data sources, and retraining the user group label recognition model on the basis of the increased number of data sources.

10. The data source-based service customizing device according to claim 1, wherein a recognition process of the user group label recognition model comprises solving iteration for the probability distribution of the behavior attributes of the users, and each iteration process further comprises differential mode iteration.

11. The data source-based service customizing device according to claim 1, wherein before the data source-based service customizing system is executed by the processor to execute the step S1, the following steps are further implemented:

S01, acquiring user generated contents in a preset number of data sources, taking the acquired user generated content in each data source as a group data sample, and labeling each group data sample with a corresponding user group label;

S02, classifying the group data samples into a training set at a preset first proportion and a verification set at a preset second proportion, wherein the sum of the first proportion and the second proportion is less than or equal to 1;

S03, training the predetermined user group label recognition model by using the group data samples in the training set, and after the training, verifying the accuracy of the trained user group label recognition model by using the verification set;

S04, if the accuracy is greater than a preset threshold value, ending the model training, and taking the trained user group label recognition model as the user group label recognition model in the above-mentioned step S2, or if the accuracy is less than or equal to the preset threshold value, increasing the number of data sources, and retraining the user group label recognition model on the basis of the increased number of data sources.

12. The data source-based service customizing device according to claim 1, wherein before the data source-based service customizing system is executed by the processor to execute the step S1, the following steps are further implemented:

S01, acquiring user generated contents in a preset number of data sources, taking the acquired user generated content in each data source as a group data sample, and labeling each group data sample with a corresponding user group label;

S02, classifying the group data samples into a training set at a preset first proportion and a verification set at a preset second proportion, wherein the sum of the first proportion and the second proportion is less than or equal to 1;

S03, training the predetermined user group label recognition model by using the group data samples in the training set, and after the training, verifying the accuracy of the trained user group label recognition model by using the verification set;

S04, if the accuracy is greater than a preset threshold value, ending the model training, and taking the trained user group label recognition model as the user group label recognition model in the above-mentioned step S2, or if the accuracy is less than or equal to the preset threshold value, increasing the number of data sources, and retraining the user group label recognition model on the basis of the increased number of data sources.

13. The data source-based service customizing method according to claim 4, wherein a recognition process of the user group label recognition model comprises solving iteration for the probability distribution of the behavior attributes of the users, and each iteration process further comprises differential mode iteration.

14. The non-transitory computer readable storage medium according to claim 7, wherein a recognition process of the user group label recognition model comprises solving iteration for the probability distribution of the behavior attributes of the users, and each iteration process further comprises differential mode iteration.

* * * * *